United States Patent
Baiz et al.

(10) Patent No.: US 10,330,505 B2
(45) Date of Patent: Jun. 25, 2019

(54) INTERCHANGEABLE FACE GAUGE FOR AN AUTOMOBILE

(71) Applicants: Enrique J. Baiz, Miramar, FL (US); Osvaldo Izquierdo, Homestead, FL (US); Cheng Jie Wu, Changhua (TW)

(72) Inventors: Enrique J. Baiz, Miramar, FL (US); Osvaldo Izquierdo, Homestead, FL (US); Cheng Jie Wu, Changhua (TW)

( * ) Notice: Subject to any disclaimer, the term of this patent is extended or adjusted under 35 U.S.C. 154(b) by 360 days.

(21) Appl. No.: 15/295,516

(22) Filed: Oct. 17, 2016

(65) Prior Publication Data

US 2017/0191856 A1 Jul. 6, 2017

(30) Foreign Application Priority Data

Dec. 31, 2015 (TW) .............................. 104221312 U

(51) Int. Cl.
| | | |
|---|---|---|
| *B60K 35/00* | (2006.01) | |
| *B60K 37/02* | (2006.01) | |
| *G01D 13/04* | (2006.01) | |

(52) U.S. Cl.
CPC .............. *G01D 13/04* (2013.01); *B60K 35/00* (2013.01); *B60K 37/02* (2013.01); *B60K 2350/2039* (2013.01); *B60K 2350/408* (2013.01); *B60K 2350/941* (2013.01); *B60K 2350/945* (2013.01); *B60K 2350/946* (2013.01)

(58) Field of Classification Search
CPC .................... G01D 13/04; B60K 35/00; B60K 2350/2039; B60K 2350/408; B60K 2350/941; B60K 2350/945; B60K 2350/946; B60K 37/02

USPC .............. 116/62.1–62.4, 305, 334, DIG. 46, 116/DIG. 47
See application file for complete search history.

(56) References Cited

U.S. PATENT DOCUMENTS

| | | | | |
|---|---|---|---|---|
| 1,989,295 | A | * | 1/1935 | Sewell ...................... B64F 1/20 116/202 |
| 2,030,068 | A | * | 2/1936 | Martin ...................... G01C 9/04 116/28.1 |
| 2,083,825 | A | * | 6/1937 | Bousfield ............... G01D 11/24 116/305 |
| D112,743 | S | * | 12/1938 | Haven .......................... D10/102 |
| 2,142,248 | A | * | 1/1939 | Lefevre ................... G01P 3/495 116/62.1 |
| 2,211,118 | A | * | 8/1940 | Hills ...................... G01D 11/28 116/62.4 |

(Continued)

*Primary Examiner* — Justin Seo
*Assistant Examiner* — Tania C Courson
(74) *Attorney, Agent, or Firm* — Quickpatents, LLC; Kevin Prince

(57) ABSTRACT

An interchangeable face gauge structure for automobile gauges comprises a gauge body, a face gauge, a retainer ring and an outer cover. The gauge body and outer cover are combined by means of assembling, which causes the outer cover to be dismountable from and re-mountable on the gauge body. The face gauge is additionally mounted on the surface of the light directing panel on the gauge body, which allows the face gauge to be replaceable with one of the type to the liking of the user after the outer cover is dismounted from the gauge body, improving the variability and visual effect of the gauge body. Further, with the convenience of the outer cover being easily mountable on the gauge body, the user is allowed to replace and mount parts by themselves, adding to the practicality of the structure.

15 Claims, 10 Drawing Sheets

(56) References Cited

U.S. PATENT DOCUMENTS

| | | | | |
|---|---|---|---|---|
| 2,248,325 | A * | 7/1941 | Bacon | G01D 11/28 116/328 |
| 2,377,011 | A * | 5/1945 | Huenergardt | F41A 19/01 235/61 A |
| 2,514,745 | A * | 7/1950 | Dalzell | G01R 31/3627 116/280 |
| 2,575,090 | A * | 11/1951 | Blouin | G04B 19/14 368/220 |
| 2,664,849 | A * | 1/1954 | Nallinger | G01D 11/28 116/62.1 |
| 2,836,144 | A * | 5/1958 | Morphis | G01F 23/00 116/204 |
| 2,842,091 | A * | 7/1958 | Kennedy | G01P 1/08 116/292 |
| 3,820,501 | A * | 6/1974 | Foglein | B23Q 17/00 116/232 |
| 4,974,217 | A * | 11/1990 | Inoue | G04B 19/08 116/308 |
| 5,088,257 | A * | 2/1992 | Loga | G01D 11/26 116/305 |
| 5,652,736 | A * | 7/1997 | Lee | G04B 37/0016 368/278 |
| 5,787,055 | A * | 7/1998 | Alpert | G04B 45/0092 368/223 |
| 5,844,863 | A * | 12/1998 | Voss | G04B 19/02 368/88 |
| 6,648,505 | B1 * | 11/2003 | Chen | G01K 5/36 116/220 |
| 6,802,276 | B2 * | 10/2004 | Sugimoto | B60K 37/02 116/286 |
| 6,817,310 | B2 * | 11/2004 | Sugiyama | G01D 13/04 116/286 |
| 7,798,091 | B2 * | 9/2010 | Suita | B60K 37/02 116/287 |
| D726,029 | S * | 4/2015 | Belamich | D10/124 |
| 10,113,882 | B2 * | 10/2018 | Solet | G01D 7/00 |
| 2013/0160561 | A1 * | 6/2013 | Chen | G01L 19/083 73/753 |

* cited by examiner

INTERCHANGEABLE FACE GAUGE FOR AN AUTOMOBILE

CROSS-REFERENCE TO RELATED APPLICATIONS

This application claims the benefit of Taiwan Patent Application 104221312, filed on Dec. 31, 2015, and incorporated herein by reference.

STATEMENT REGARDING FEDERALLY SPONSORED RESEARCH AND DEVELOPMENT

Not Applicable.

FIELD OF THE INVENTION

This invention relates to an automobile gauge, and in particular to an interchangeable face gauge structure for automobile gauges.

DISCUSSION OF RELATED ART

A known gauge structure, as is shown in FIGS. 9 and 10, comprising: A gauge body 50, a retainer ring 60 and an outer cover 70, wherein a relatively large surface 51 is on the front side of the gauge body 50, and a face gauge 52 is fixed on surface; further, provided in the center of face gauge 52 is the connection of a pointer 53, and the retainer ring 60 is fixed on face gauge 51 of gauge body 50 by having one side nested thereon, and on the other side set a see-through plate 61; last but not least, the circular cowling of outer cover 70 caps the outside of retainer ring 60 and see-through plate 61, causing pressing section 71 with an inward front end to be placed against see-through plate 61, and causing retainer ring 60 and see-through plate 61 to be confined between gauge body 50 and outer cover 70; at this point the end of outer cover 70 is beyond surface 51 of gauge body 50; then a packing tool is used to press the end of outer cover 70 towards the inner side of surface 51, hence forming a nested ring 72 fixed on surface 51, and a gauge structure is so completed.

If the above known structure is observed in detail, it is not difficult to find shortcomings existing therein, which are primarily due to: As is described, outer cover 70 is nested by being pressed and packed down on surface 51 of gauge body 50; if outer cover 70 is forcibly dismounted from gauge body 50, then the structure of outer cover 70 will necessarily be damaged, causing outer cover 70 unable to be remounted on gauge body 50, which does not allow consumers to mount outer cover 70 on and dismount it from gauge body 50 just by themselves. This makes it impractical; also, face gauge 52 of the gauge body 50 is fixed on surface 51, unable to be dismounted and replaced, which renders face gauge 52 invariable and is indeed a shortcoming of the known structure in its use.

In view of that, the creator has, aiming at the above objective, taken advantage of his years of experience in the manufacture, development and design of relevant products, and ultimately produced this practical creation after further design and prudent evaluation.

SUMMARY OF THE INVENTION

This creation is intended to resolve a technical issue that lies in the above shortcoming existing with the current technology, in order to provide an interchangeable face gauge structure for automobile gauges.

An interchangeable face gauge structure for automobile gauges, comprising: A gauge body, a face gauge, a retainer ring and an outer cover, wherein on one side of the gauge body set at least one positioning bulge, on which a light directing panel is nested; further in the center of the light directing panel set a perforation which provides connection of a pointer; and a combo is set peripheral to the gauge body; at least one notch is set on the external circumference of the face gauge to be nested with the positioning bulges on the edge of the assembly, to cause the face gauge to be attached to the light directing panel; further, a through-hole is made in the center; the retainer ring is secured on one side on the upper circumference of the face gauge, the other side with a see-through plate; the outer cover caps the external circumference of the see-through plate, the retainer ring and the light directing panel; and a junction is set to form an assembly with the combo of the gauge body, to allow the outer cover to be dismountable from and re-mountable on the gauge body. From the foregoing description, an interchangeable face gauge structure for automobile gauges is formed.

Comparison with prior art in respect of efficacy: The gauge body and outer cover are combined by means of assembling, which causes the outer cover to be dismountable from and re-mountable on the gauge body; the face gauge is additionally mounted on the surface of the light directing panel on the gauge body, which causes the face gauge to replaceable with one of the type to the liking of the user after the outer cover is dismounted from the gauge body, improving the variability and visual effect of the gauge body; further, with the convenience of the outer cover being easily mountable on the gauge body, the user is allowed to replace and mount [parts] by themselves, adding to the practicality of the structure.

DETAILED DESCRIPTION OF THE PREFERRED EMBODIMENT

Figure 1:
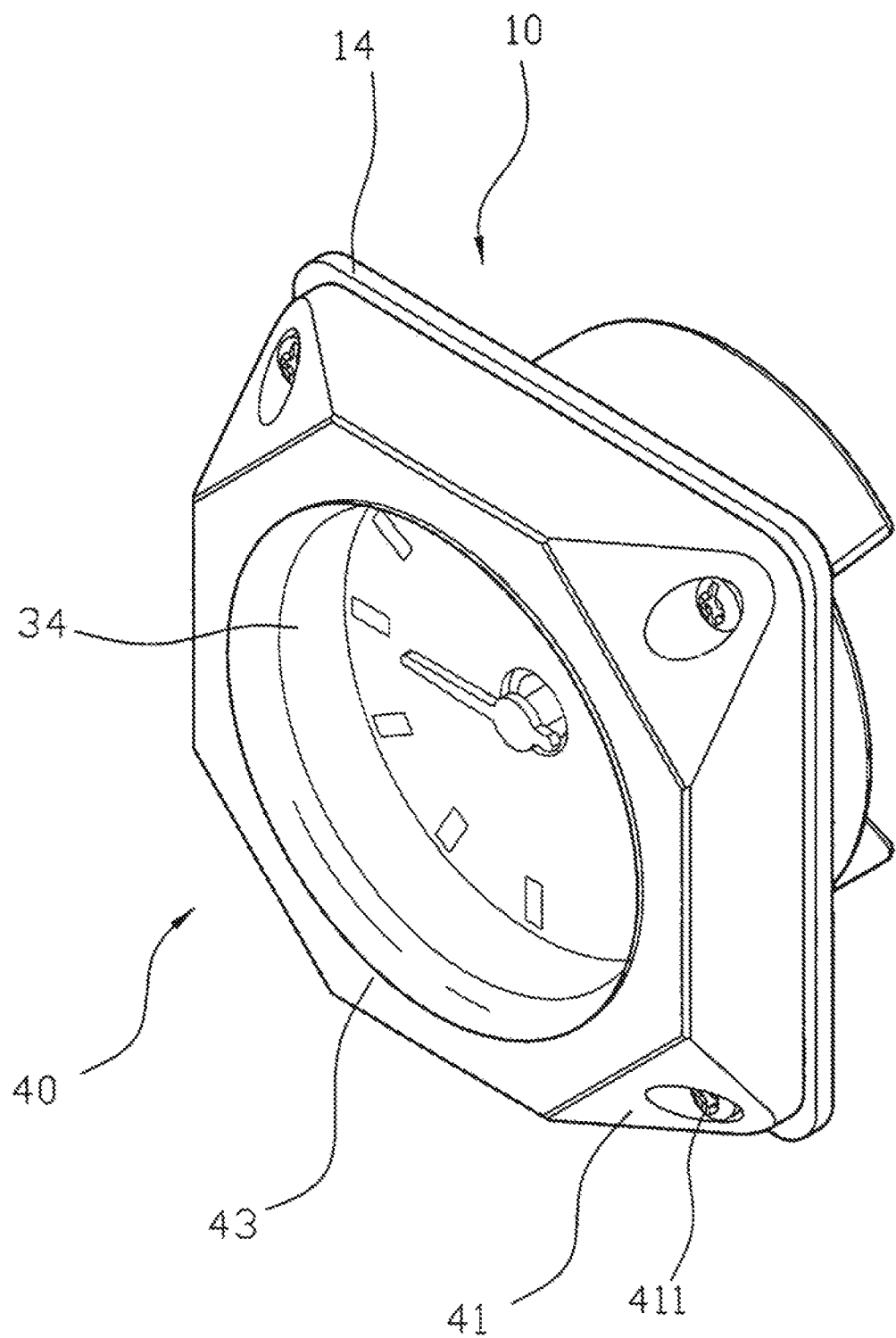
FIG. 1: A stereogram of this creation.
Figure 2:
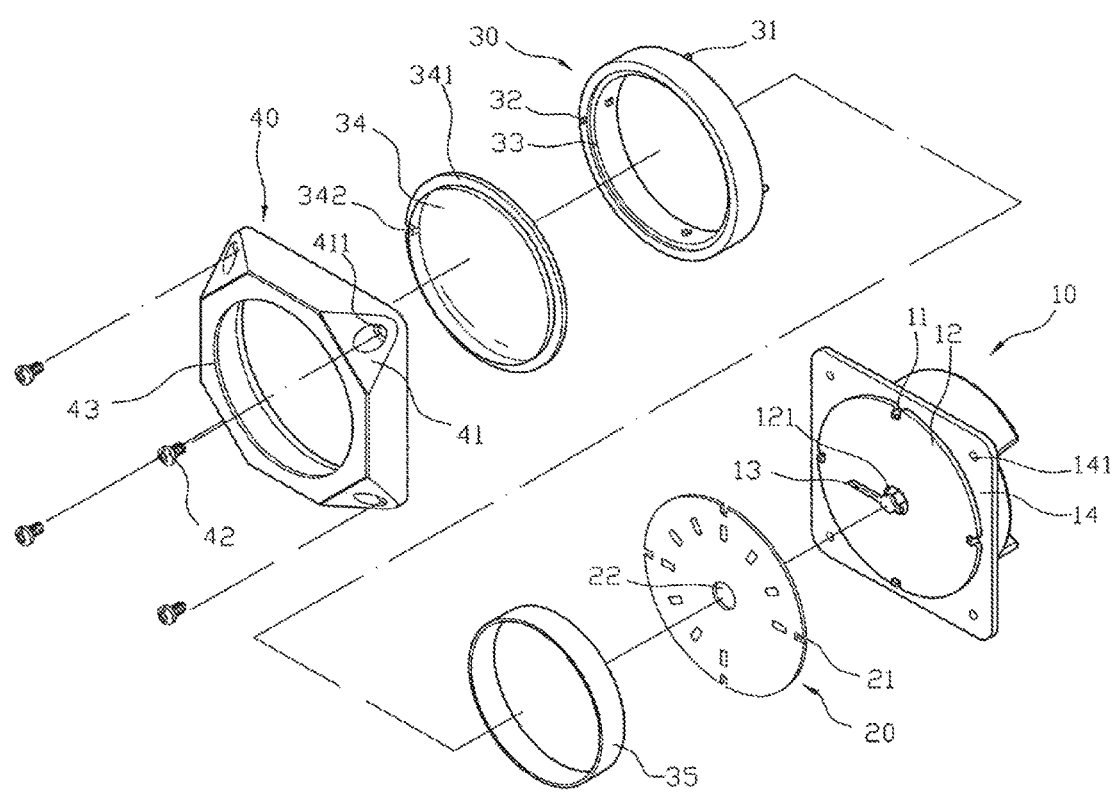
FIG. 2: A breakdown drawing of this creation.

To provide your respectable examination panel with a further understanding and knowledge of the purposes, features and efficacy of this, please read the detailed description that follows with reference to the [Brief Description of the Figures]: first, please refer to FIGS. 1 and 2, an interchangeable face gauge structure for automobile gauges, comprising: A gauge body 10, a face gauge 20, a retainer ring 30 and an outer cover 40, wherein on the edge of the gauge body 10 set at least one positioning bulge 11, and nested a light directing panel 12, in the center of which a perforation 121 is made to provide connection of pointer 13; further, extending peripheral to the gauge body 10 is a combo 14, on which a few screw lock holes 141 are made; at least one notch 21 is set on the periphery of face gauge 20 to be nested with positioning bulge 11 on gauge body 10, and hence attached to light directing panel 12; further, a through-hole 22 is made in the center, and a retainer ring 30 is set on the upper circumference of face gauge 20 on one edge, on which edge at least one nested button bulge 31 is set to be matched with the positioning bulge 11 on gauge body 10 according to its position; on the other edge set a stopper 32 and a circular rabbet 33, in order to have a see-through plate set thereon, and on the inner edge of the retainer ring 30 set an inner rubber ring 35, and extending peripheral to the see-through plate 34 is a stepped nesting section 341, on which a stopper hole 342 is set to be nested with stopper 32 for positioning; facing the edge of retainer ring 30 set a circular bulge 343 to be nested with and secured on circular rabbet 33; an outer cover 40 caps the outer circumference of see-through plate 34, retainer ring 30 and light directing panel 12, and a combo 14 composed of junction 41 and gauge body 10 is set, and the combo 41 has several punched hole 411 made to correspond to the screw lock hole 141 on combo 14 in sequential order, and to be locked by bolt 42, so that outer cover 40 is dismountable from and re-mountable on gauge body 10; and the edge of outer cover 40 is indented to have a pressing section 43 set thereon to be placed against the stepped nesting section 341 of see-through plate 34, and hence see-through plate 34 and retainer ring 30 are confined to gauge body 10.

Figure 3:
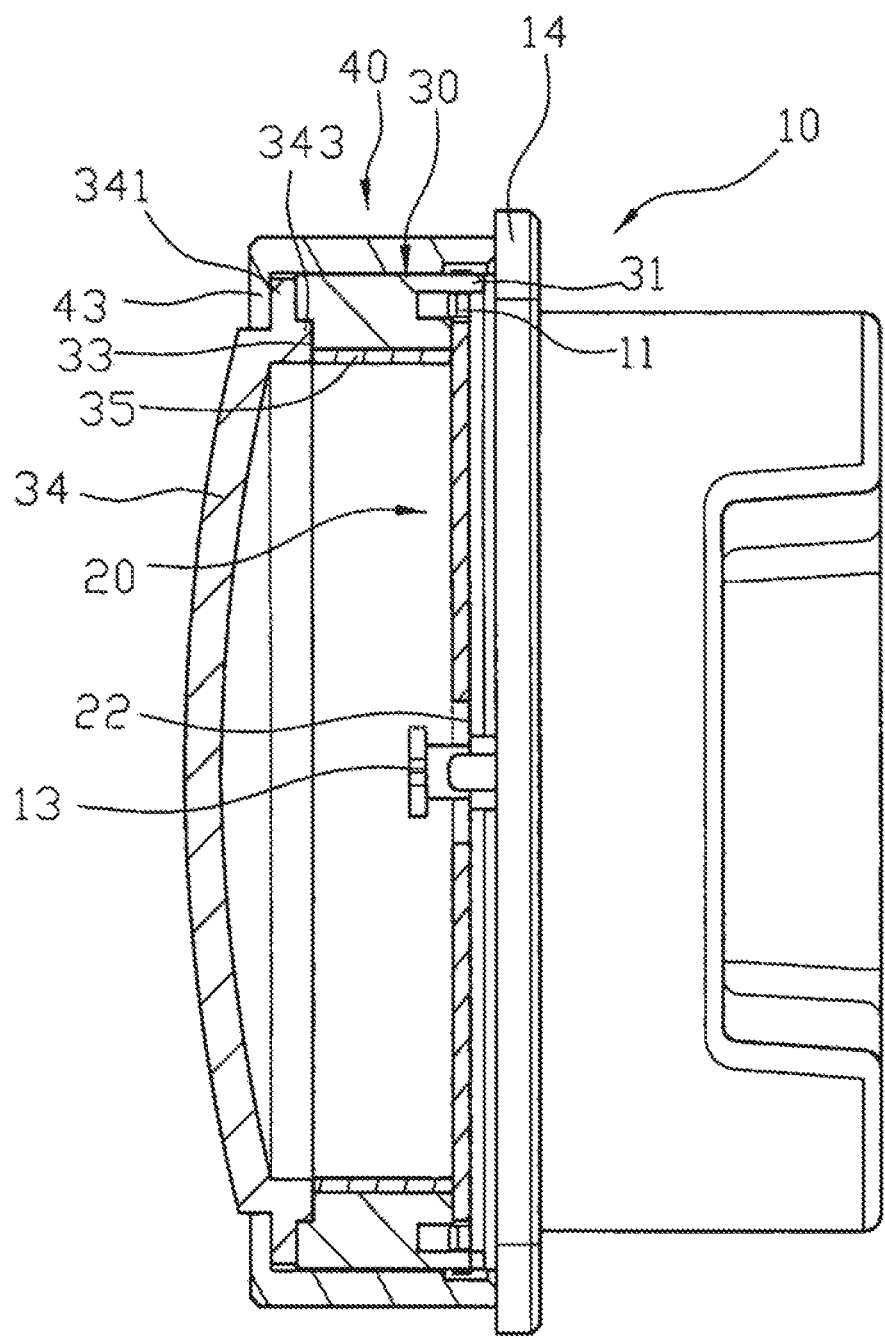
FIG. 3: A sectional view of the assembly of this creation.

Please further refer to FIGS. 1, 2 and 3 for composition of its structure. The face gauge 20 is additionally mounted on the light directing panel 12 of gauge body 10, and it is mounted by first causing pointer 13 to penetrate through-hole 22, and then causing notch 21 on its circumference to be respectively nested with positioning bulge 11 in sequential order, and hence to cap and be attached to light directing panel 12; further, on the other edge of retainer ring 30 set a see-through plate 34, which is secured by causing stepped nesting section 341 to be placed against the edge of retainer ring 30, and stopper hole 342 to be nested with stopper 32 on retainer ring 30; further, circular bulge 343 is placed against the inside of circular rabbet 33; last but not least, outer cover 40 caps see-through plate 34, retainer ring 30 and light directing panel 12 to be combined with gauge body 10, and provides several bolt 42 to penetrate through punched hole 411 on junction 41 in sequential order, and through screw lock hole 141 on combo 14 to be locked; and by causing the pressing section 43 of outer cover 40 to be placed against the stepped nesting section 341 of see-through plate 34, the automobile gauge structure is so completed.

Figure 4:
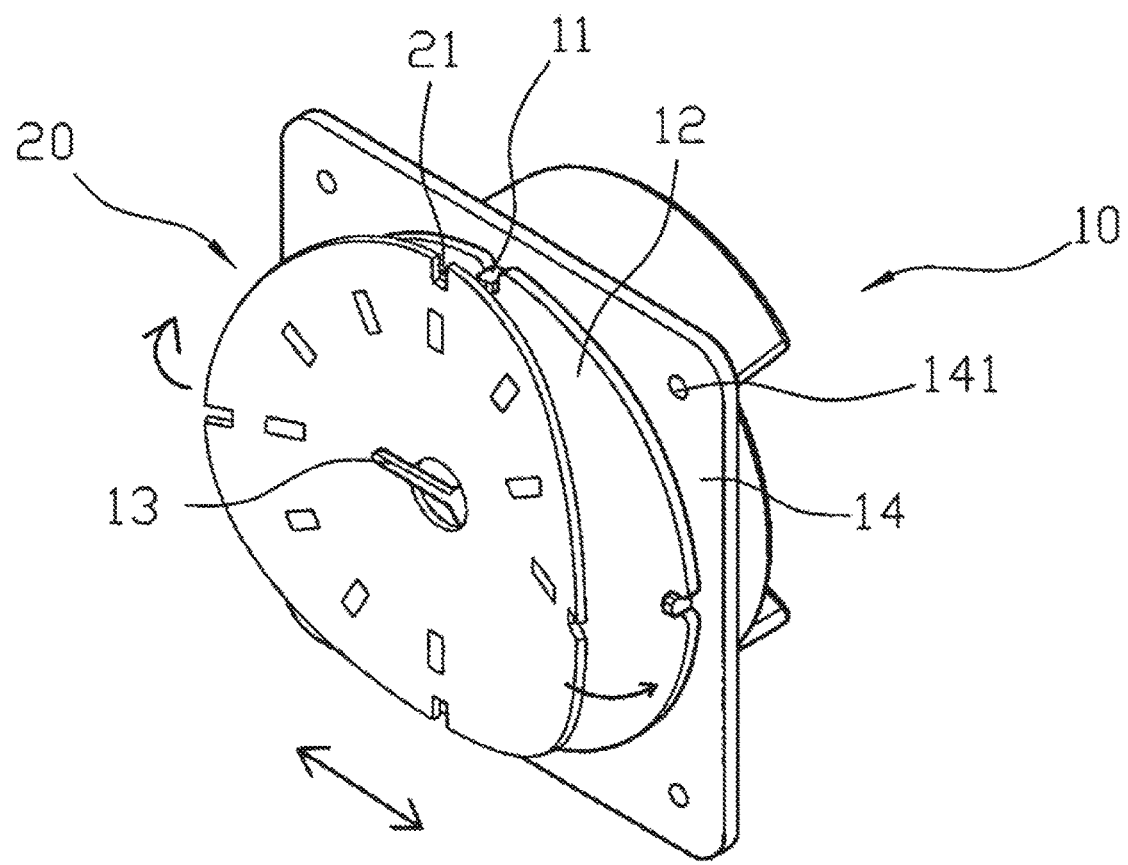
FIG. 4: A face gauge replacement action view of this creation.
Figure 5:
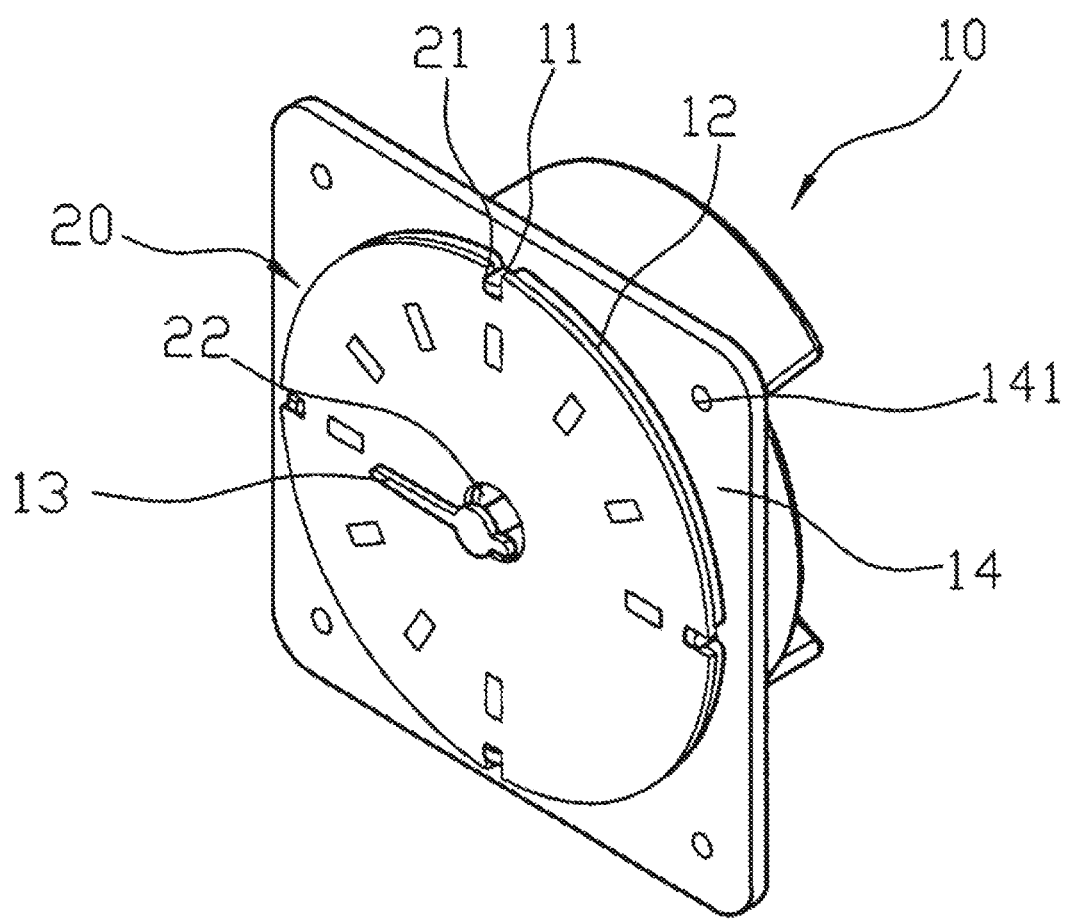
FIG. 5: An illustration of face gauge replacement of this creation.

Please continue to refer to FIGS. 3, 4 and 5 for status and efficacy of the actual use of the structure. The gauge body 10 and outer cover 40 are combined by means of assembling, which causes the outer cover 40 to be dismountable from and re-mountable on the gauge body 10; the face gauge 20 is additionally mounted on the surface of the light directing panel 12 on the gauge body 10, which causes the face gauge 20 to replaceable with one of the type to the liking of the user after the outer cover 40 is dismounted from the gauge body 10, improving the variability and visual effect of the gauge body 10; further, with the convenience of the outer cover 40 being easily mountable on the gauge body 10, the user is allowed to replace and mount [parts] by themselves, adding to the practicality of the structure.

Figure 6:
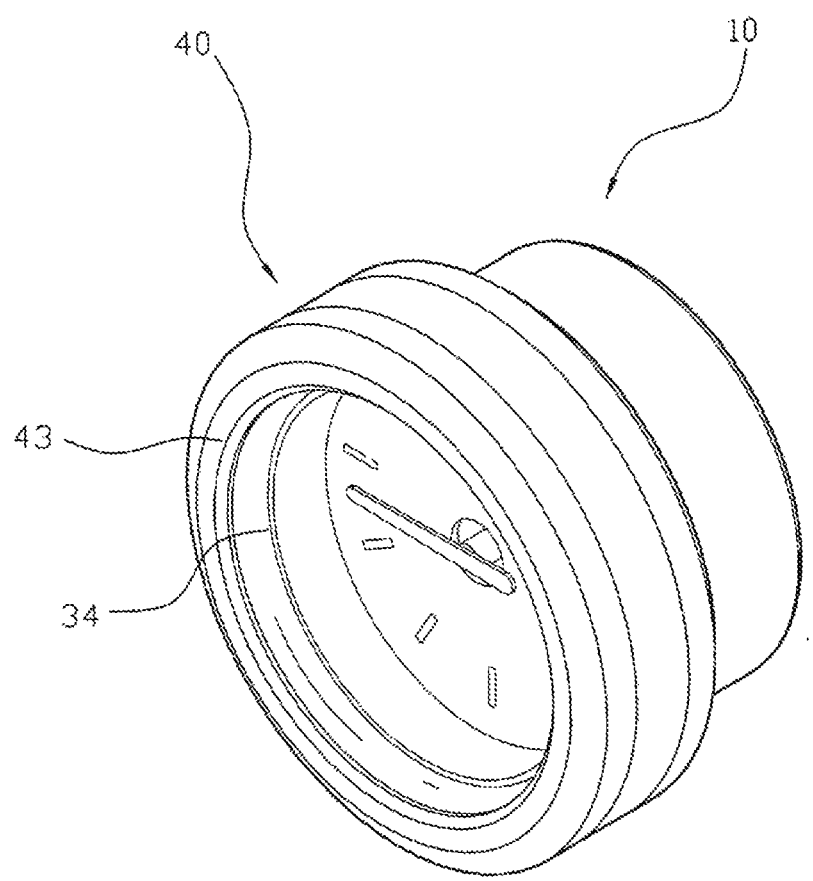
FIG. 6: Another embodiment of this creation.
Figure 7:
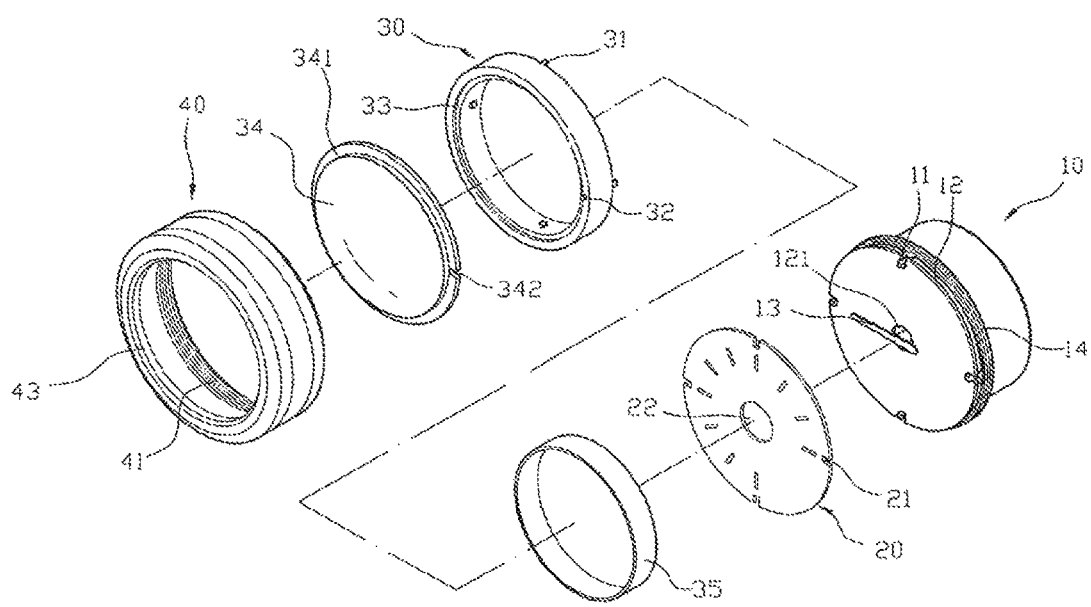
FIG. 7: A breakdown drawing of another embodiment of this creation.
Figure 8:
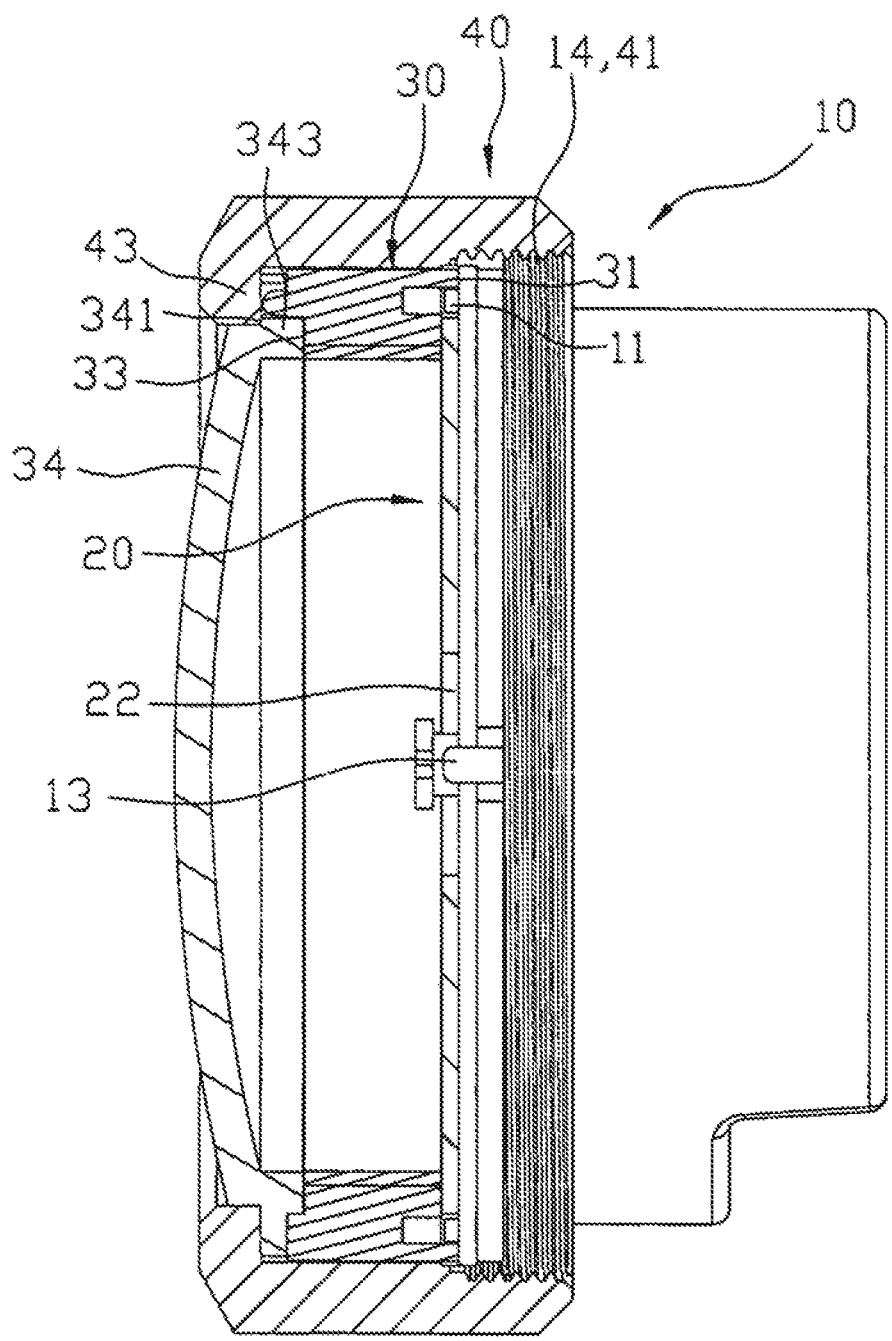
FIG. 8: A sectional view of another embodiment of this creation.
Figure 9:
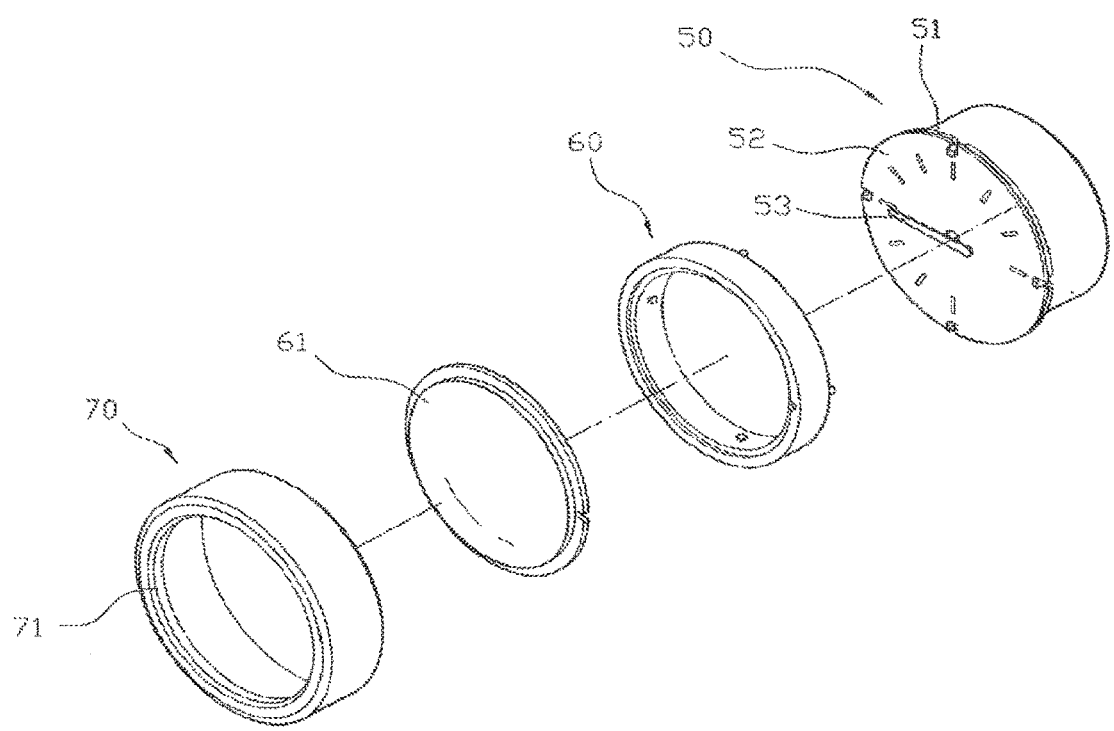
FIG. 9: A breakdown drawing of the known art.
Figure 10:
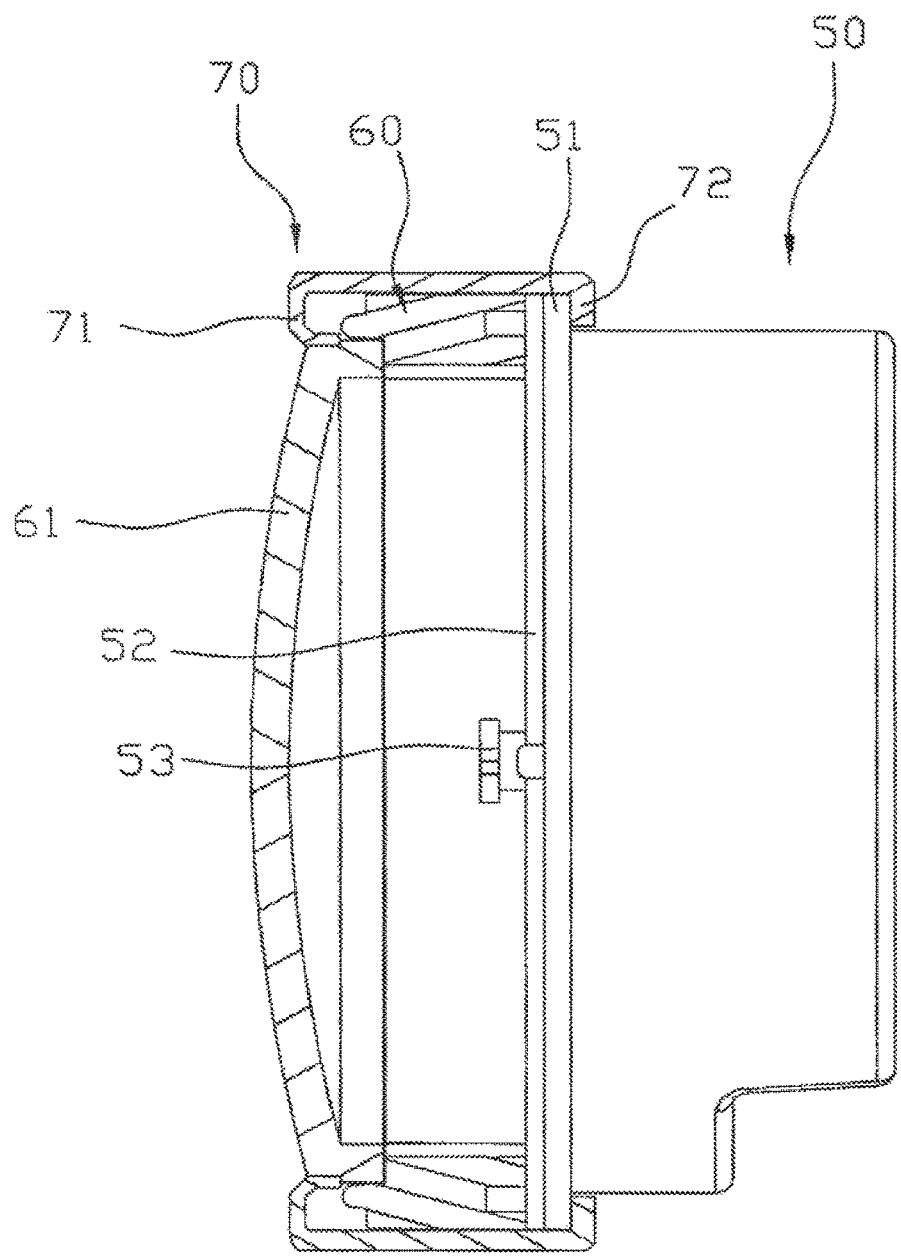
FIG. 10: A sectional view of the assembly of the know art.

Please refer to FIGS. 6, 7 and 8 for another embodiment of the structure. The combo 14 of the gauge body 10 has an outer thread section set thereon, and outer cover 40 has inner thread section set from its inner diameter to form junction 41, whereby outer cover 40 is combined with and secured on gauge body 10 by means of screw locking.

From the foregoing, this creation is indeed sufficient as a breakthrough structural design incorporating creative improvements, and also meets the requirements for industrial instrumentality and progressiveness. In addition, this inventive creation has never been found in any publications, and shall meet the requirements of the relevant regulations of the Patent Law. Therefore, this creation patent application is filed in accordance with the law, and I would most sincerely appreciate it if your respectable examination panel could grant legitimate patent rights. The above descriptions, as only one of the relatively good embodiments of this creation, are not intended to set any limitations on such embodiments; any changes and modifications based on the claims of this creation patent shall fall within the scope of this creation patent.

What is claimed is:

1. An interchangeable face gauge structure for an automobile gauge, comprising:
   a gauge body;
   at least one positioning bulge positioned on at least one side of the gauge body, the at least one positioning bulge extending outward from a plane defined by a light directing panel that is nested on one side of the gauge body;
   a pointer traversing a perforation in a central portion of the light directing panel; and
   a combo peripherally fixed with the gauge body;
   at least one notch formed on an external circumference of the face gauge, the at least one notch nesting with the at least one positioning bulge causing the face gauge to be rotationally fixed to the light directing panel;
   a through-hole formed in a center of the face gauge;
   a retainer ring secured at one side thereof with an upper circumference of the face gauge, the other side of the retainer ring fixed with a see-through plate;
   an outer cover capping an external circumference of the see-through plate, the retainer ring and the light directing panel; and
   at least one junction adapted to form an assembly with the combo of the gauge body,
   whereby the outer cover is dismountable from and re-mountable to the gauge body.

2. The interchangeable face gauge structure of claim 1, further comprising:
   at least one nested button bulge disposed on a first side of the retainer ring, the at least one nested button bulge operable to nest with the at least one positioning bulge on the gauge body in a sequential order;
   a stopper and a circular rabbet disposed on a second, opposite side of the retainer ring, the stopper and circular rabbet receiving a see-through plate to be mounted;
   a stepped nesting section extending peripheral to the see-through plate;
   a stopper hole formed an adapted set to be nested with the stopper; and
   a circular bulge disposed in the see-through plate facing an edge of the retaining ring, the circular bulge operable to nest with the circular rabbet.

3. The interchangeable face gauge structure of claim 2, wherein one side of the outer cover is indented to define a pressing section adapted to be placed against the stepped nesting section of the see-through plate, whereby the see-through plate and the retainer ring are fixable with the gauge body.

4. The interchangeable face gauge structure of claim 3, wherein the combo of the gauge body includes at least one screw lock hole, and wherein the junction of the outer cover includes at least one punched hole, whereby the outer cover is fastenable to the gauge body with at least one bolt.

5. The interchangeable face gauge structure of claim 3, wherein an outer thread section is formed on the combo of the gauge body, and an inner thread section is formed on the outer cover at an inner diameter thereof to define the junction, whereby the outer cover is fixed with and secured to the gauge body through of screw locking.

6. The interchangeable face gauge structure of claim 2, wherein the combo of the gauge body includes at least one screw lock hole, and wherein the junction of the outer cover includes at least one punched hole, whereby the outer cover is fastenable to the gauge body with at least one bolt.

7. The interchangeable face gauge structure of claim 2, wherein an outer thread section is formed on the combo of the gauge body, and an inner thread section is formed on the outer cover at an inner diameter thereof to define the junction, whereby the outer cover is fixed with and secured to the gauge body through of screw locking.

8. The interchangeable face gauge structure of claim 1 further comprising an inner rubber ring disposed about an inner edge of the retainer ring.

9. The interchangeable face gauge structure of claim 8, wherein the combo of the gauge body includes at least one screw lock hole, and wherein the junction of the outer cover includes at least one punched hole, whereby the outer cover is fastenable to the gauge body with at least one bolt.

10. The interchangeable face gauge structure of claim 8, wherein an outer thread section is formed on the combo of the gauge body, and an inner thread section is formed on the outer cover at an inner diameter thereof to define the junction, whereby the outer cover is fixed with and secured to the gauge body through of screw locking.

11. The interchangeable face gauge structure of claim 1, wherein the combo of the gauge body includes at least one screw lock hole, and wherein the junction of the outer cover includes at least one punched hole, whereby the outer cover is fastenable to the gauge body with at least one bolt.

12. The interchangeable face gauge structure of claim 1, wherein an outer thread section is formed on the combo of the gauge body, and an inner thread section is formed on the outer cover at an inner diameter thereof to define the junction, whereby the outer cover is fixed with and secured to the gauge body through of screw locking.

13. An interchangeable face gauge structure for automobile gauges, comprising:
a gauge body;
at least one positioning bulge positioned on at least one side of the gauge body, the at least one positioning bulge extending outward from a plane defined by a light directing panel is nested on one side of the gauge body;
a perforation in a central portion of the light directing panel for providing connection of a pointer; and
a combo set peripheral to the gauge body;
at least one notch set on an external circumference of the face gauge, the at least one notch nesting with the at least one positioning bulge causing the face gauge to be rotationally fixed to the light directing panel;
a through-hole in a central region of the face gauge;
a retainer ring is secured on one side to an upper circumference of the face gauge, the other side of the retainer ring secured to a see-through plate;
an outer cover capping an external circumference of the see-through plate, the retainer ring and the light directing panel;
a junction is set to form an assembly with the combo of the gauge body, allowing the outer cover to be dismountable from and re-mountable on the gauge body;
at least one nested button bulge disposed on a first side of the retainer ring, the at least one nested button bulge operable to nest with the at least one positioning bulge on the gauge body in sequential order;
a stopper and a circular rabbet disposed on a second, opposite side of the retainer ring, the stopper and circular rabbet allowing a see-through plate to be mounted;
a stepped nesting section extending peripheral to the see-through plate;
a stopper hole set to be nested with the stopper;
a circular bulge disposed in the see-through plate facing an edge of the retaining ring, the circular bulge operable to nest with the circular rabbet; and
an inner rubber ring disposed about an inner edge of the retainer ring.

14. The interchangeable face gauge structure for automobile gauges according to claim 13, wherein several screw lock holes are set on the combo of the gauge body, and several punched holes on the junction of the outer cover, to be locked with bolts.

15. The interchangeable face gauge structure for automobile gauges according to claim 13, wherein an outer thread section is set on the combo of the gauge body, and the outer cover includes an inner thread section set from its inner diameter to form the junction, whereby the outer cover is combined with and secured on the gauge body by means of screw locking.

* * * * *